Figure 1:
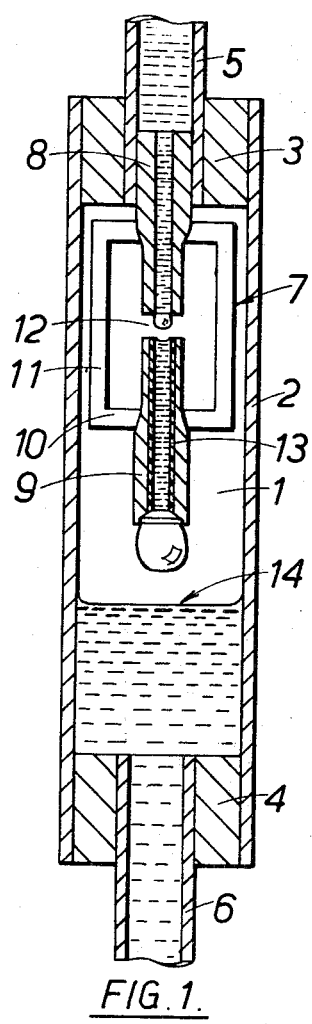

United States Patent
Clarke

[11] 3,826,137
[45] July 30, 1974

[54] METHOD FOR MEASURING THE RATE OF FLOWS OF LIQUIDS

[76] Inventor: Ellis Whiteside Clarke, 47 Deramare Dr., Belfast, England

[22] Filed: May 31, 1972

[21] Appl. No.: 258,370

[30] Foreign Application Priority Data
June 2, 1971 Great Britain.................. 18518/71
Jan. 3, 1972 Great Britain........................ 31/72

[52] U.S. Cl............ 73/194 R, 128/214 C, 222/420
[51] Int. Cl............................................. G01f 1/00
[58] Field of Search .................... 73/194 R, 194 E; 128/DIG. 13, 214 R, 214 C, 214 E; 222/420, 422

[56] References Cited
UNITED STATES PATENTS
3,030,954  4/1962  Thornton, Jr................. 128/214 C
3,311,268  3/1967  Fields........................ 128/214 C X
3,596,515  8/1971  Cramer............................ 73/194 R Primary Examiner—Richard C. Queisser
Assistant Examiner—John P. Beauchamp
Attorney, Agent, or Firm—Scrivener, Parker, Scrivener & Clarke

[57] ABSTRACT

A liquid flow rate is measured by forming the liquid into a stream of drops of a controlled size and counting the number of drops formed during a timed period. The drops are formed at an orifice and their size is controlled by providing a surface close to the orifice which the drops contact as they form and are thereby drained. The surface close to the orifice may be the surface of a body of the liquid supported by capillary action on a structure provided adjacent to the surface. Further the orifice may be the opening in a nozzle which is fixed together with said supporting structure in a chamber closed apart from an inlet and an outlet for the liquid.

6 Claims, 3 Drawing Figures

PATENTED JUL 30 1974    3,826,137

METHOD FOR MEASURING THE RATE OF FLOWS OF LIQUIDS

This invention relates to the measurement of the rate of flow of a liquid, and in particular to an improved method of the kind in which the liquid is caused to drip from an orifice and the number of drops falling within a timed period is counted.

Such a method of measuring liquid flow rate is frequently used to determine the rate of administration of blood or a medicinal liquid to a patient, and has been found to be satisfactory except where a relatively slow flow rate is to be determined. Slow flow rates may especially be required in the treatment of infants, and since, with known infusion equipment, rates as slow as one drop in two minutes may be used, considerable time is required to carry out the method. In such cases of slow flow rates if the volume of the drops formed could be reduced their rate of formation would be increased and the measurement could be carried out more quickly and accurately.

The drops form at an orifice or nozzle and fall away from the orifice when their weight exceeds the total force due to surface tension at the line of contact between the surface of the drop and the orifice. Thus the volume of the drops depends primarily on the surface tension force and a reduction in the size of the orifice will result in a corresponding reduction in the volume of the drops formed. However it has been found that an orifice of 1 millimetre produces drops of about one hundredth of a millilitre and that a reduction in orifice size below this does not result in any further appreciable diminution in size of the drops. Moreover at orifice sizes of less than 1 millimetre diameter any slight benefit obtained from having a finer orifice is offset by the disadvantage resulting from the provision of a constriction in the equipment in which the orifice is located, the constriction interfering with the freeflow conditions needed, for example, when flushing air out of the equipment before it is connected to a patient.

According to one aspect of the invention a method of measuring a liquid flow rate comprises forming the liquid flow into a stream of drops at an orifice, controlling the size of the drops formed by draining the drops when they attain a predetermined size by contact with a surface presented at a fixed distance from the orifice, and counting the number of drops formed during a measured period of time.

According to another aspect of the invention apparatus enabling liquid flow rates to be measured comprises drop-forming means having an orifice at which drops of liquid can be formed, and drop-control means operative in use to present a surface spaced from the orifice by such a distance that drops forming at the orifice contact the surface and are thereby drained before they attain a size at which their attachment to the drop-forming means breaks naturally.

Preferably the drop-forming means and the drop-control means are housed within a chamber which has an inlet opening and an outlet opening. The drop-forming means may comprise a nozzle forming a passage through which liquid can flow from the inlet opening to the orifice.

The surface presented by the drop-control means may be the surface of a body of liquid adjacent to the orifice. As a drop forms at the orifice it increases in size until it contacts the surface of the body of lquid whereupon it drains into the body of liquid. Such a liquid surface is hereinafter referred to as a 'drained liquid surface.'

In a simple form of the apparatus the drained liquid surface comprises the surface of the liquid which collects in the bottom of the chamber when liquid flow is started through the inlet which is at the top of the chamber, the nozzle being directed downwards. By expelling air from the chamber the level of liquid in the chamber can be raised until drops forming at the orifice touch the surface of the liquid thus altering the balance of surface tension forces in the drops so that on contact with the surface the drops coalesce immediately with the body of fluid in the chamber. The size of drop that can be formed thus is dependant on the size of the orifice and the size of the gap between the orifice and the drained liquid surface. Drops of as small as one thousandth of a millilitre have been formed without undue restriction of the size of the orifice.

However the level of liuqid in the bottom of the chamber cannot readily be controlled with sufficient accuracy to produce drops of a constant size and the drained liquid surface is preferably formed on a body of liquid supported by capillary action on a fixed structure adjacent to the orifice. The structure may comprise a body of porous material. However if the liquid used is blood or contains emulsified material, the porous meterial is likely to become clogged and then will not drain properly. In order to overcome this difficulty the structure may alternatively comprise a length of tube, a control tube, either being of a small enough diameter to support a body of liquid with the drained liquid surface adjacent to the orifice or having that end which is adjacent to the orifice covered with a piece of gauze or any other suitable fine mesh material to support a body of liquid on which the drained liquid surface is formed.

The apparatus of the invention may be combined with a known kind of drip-tube for forming drops of a size controlled only by the size of orifice at which they are formed. The liquid drained from the body of porous material or the control tube hereinbefore described may be fed into such a known drip-tube. The control tube and the drip-tube may be combined in a single length of tubing. Such combined apparatus has the advantage that both slow and fast flow rates can be readily determined by counting respectively the smaller controlled drops or the larger free-formed drops.

Apparatus in accordance with the invention may be used in medical infusion equipment having flow regulating means such as, for example, is described in my copending Patent application Ser. No. 179,510, filed Sept. 10, 1971. Where the apparatus is combined with the known kind of drip tube a chamber of considerable volume is needed to accomodate the apparatus. When such apparatus is located in the position preferred in known infusion equipment, that is upstream of the regulating means, in use the liquid flow through the orifice is separated from the flow through the regulating means by the air in the chamber. The air being compressible acts as a spring and there is a tendancy for the liquid column leading to the orifice to oscillate, this leading to inconsistencies in the number of drops formed per unit of volume flow and thus preventing an accurate flow rate measurement being taken. However if the apparatus is located upstream of the regulating means it will work satisfactorily provided that the volume of the chamber is made as small as is reasonably possible.

In apparatus having a combined drip tube and control tube with a supporting structure for the combined tube there is a tendency for drops of liquid to accumulate between the nozzle, the supporting structure, the combined tube and the walls of the chamber when the apparatus is in a small form. Such accumulations of liquid form drainage paths preventing the desired flow of liquid through the apparatus. It is therefore desirable to make the apparatus from or face the apparatus with a nonwettable material such as, for example, polypropylene. However if the inner walls of the combined tube are non-wettable gas bubbles will tend to cling to them and interfere with liquid flow. Drainage from the drained liquid surface is retarded by such gas bubbles and drops of fluid bridge the gap between the orifice and the drained liquid surface for increasingly longer periods giving longer periods of continuous flow across the gap than would occur during correct functioning. This difficulty can be overcome by making the inner walls of the combined tube wettable. Where the apparatus as a whole is made from a nonwettable material an insert of a wettable material, such as for example nylon, may be fitted in the combined tube.

Figure 3:
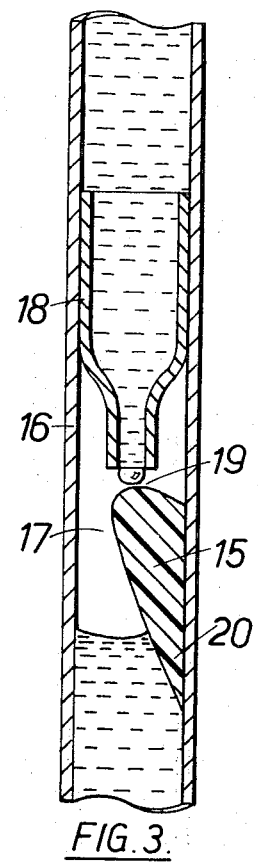
Figure 2:
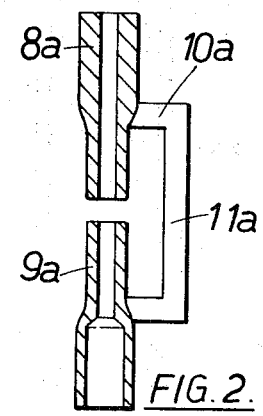

Some embodiments of my invention will now be described with reference to and as shown in the accompanying drawings, in which:

FIG. 1 is a cross-section through one form of apparatus embodying the invention, FIG. 2 is a cross section through an alternative construction of nozzle and combined tube to that shown in the apparatus of FIG. 1, and FIG. 3 is a cross-section through another form of apparatus embodying the invention.

The apparatus shown in FIG. 1 comprises a chamber 1 formed within a length of transparent tube 2 fitted with end plugs 3 and 4. Openings formed within the end plugs 3 and 4 receive an inlet tube 5 and outlet tube 6 respectively communicating with the chamber 1. A nozzle and capillary tube unit 7 is fitted within the chamber 1.

The nozzle and capillary tube unit 7 comprise two lengths of capillary tube, one of the lengths forming a nozzle 8 and the other length forming a combined drip and control capillary tube 9. The nozzle 8 and the capillary tube 9 are each formed with a pair of radial arms 10 midway along their lengths. The outer ends of corresponding radial arms 10 of the nozzle and capillary tube are connected to opposite ends of support strips 11 to hold the nozzle and capillary tube in axial alignment with a gap 12 between their adjacent ends. The nozzle and capillary tube unit 7 is positioned in the chamber 1 by inserting the end of the nozzle 8 opposite to the gap 12 into the end of the inlet tube 5 in which it is a press fit.

The nozzle 8 has a bore of constant internal diameter but its wall thickness is reduced at that end adjacent to the capillary tube. The combined tube 9 is of a form corresponding to the nozzle but its end opposite to the gap 12 is counterbored. The nozzle and capillary tube unit 7 is formed as a single moulding of a nonwettable material such as polypropylene. However the bore of the capillary tube 9 is lined as shown at 13 with a wettable material such as nylon which may be in the form of an insert around which the capillary tube is moulded or which is inserted into the capillary tube after moulding.

The latter method of placing the wettable insert has the advantage that the gap 12 can be accurately gauged by placing a block gauge in the gap and pressing the insert into contact with the gauge. The size of the gap is of the same order as the diameter of the bore of the nozzle and is best determined by experiment in order to obtain the desired results for use with a given liquid.

The apparatus shown in FIG. 1 is suitable for use in medical infusion equipment of the kind described and illustrated in my copending Patent application Ser. No. 179,510 and is designed primarily to replace the drip chamber in that equipment. In use air is expelled from the chamber and liquid introduced to the level 14. When liquid flow is commenced a column of liquid builds up in the capillary tube 9 to form a drained liquid surface under the nozzle. Liquid then flowing in through the nozzle forms into a stream of drops which contact the drained liquid surface and drain into the column of liquid in the capillary tube 9. The drops in the gap 12 are drained before they reach the size at which they would fall away freely from the nozzle 8. The liquid drained into the capillary tube 9 flows through the tube to form relatively large drops at the counterbored end of the tube. Slow liquid flow rates can be measured by counting the number of small drops forming in a measured time, the size of the small drops having been determined. However should the rate of flow be too high to count the number of small drops the large drops can then be counted, the number of small drops taken to form one large drop having been determined. There may for example be 10 small drops to one large drop and a convenient mode of calibration is one where one small drop every 15 seconds indicates a flow rate of one millilitre per hour.

FIG. 2 shows a modified form of the nozzle and capillary control and drip tube shown in the apparatus in FIG. 1. In FIG. 2 the nozzle 8a and capillary tube 9a each have only one radial arm 10a and a single strip 11a joins the nozzle to the combined tube. Also the combined tube has a constant wall thickness but has two portions of different diameter joined by a step, the portion of small diameter being adjacent to the nozzle.

The nozzle and capillary tube unit may be manufactured from a single length of tube of a thermoplastics material. This form is not illustrated. A portion at the centre of the tube is crimped and heated to reduce its bore and form the required capillary tube. The crimped tube is then mounted on a support structure and a short portion of the crimped portion cut away to provide the drop-forming gap.

In a more compact form of apparatus than that illustrated in FIG. 1 the nozzle and the capillary tube may be joined together by a length of wire extending across the gap and into the bores of the nozzle and capillary tube where its ends are fixed. The wire thus serves to support the capillary tube. The wire, which may be of a material such as for example stainless steel, is of such a small diameter that in effect it is not wettable and although it bridges the gap it does not interfere with the formation of the drops nor provide a drainage path. The nozzle and capillary tube unit can be made so small in this form that it will fit into a feed tube of such a diameter that a pocket of air can be maintained in the feed tube between columns of liquid. In such a construction the capillary tube acts only as a control tube for supporting a drained liquid surface adjacent to the nozzle there being insufficient room to form a large drop and the end of the control tube opposite the nozzle and gap being immersed in liquid in use. Such apparatus will continue to function even when inverted.

Another form of apparatus, which embodies the invention and may be made small enough to work in an inverted position, is shown in FIG. 3. The apparatus comprises a mass of porous material 15 mounted in the bore of a tube 16 a length of which acts as the walls of a chamber 17. The porous material may be any suitable material such as for example matted cellulose fibres, a plastics foam with open pores or a porous ceramic material. A nozzle 18 comprises a length of tube having two portions of different diameters joined by a step. The outer diameter of the larger portion of the nozzle 18 is such that the nozzle is a press fit in the bore of the tube 16 and is thus fixedly located in position in the tube 16 with the narrower end of the nozzle adjacent to the porous mass 15. A drop-forming gap is provided between the nozzle and the mass. In use a portion of the porous mass 15 is immersed in liquid as shown at 20 and drops formed by the nozzle drain through the porous mass to liquid beyond. This form of apparatus however is not normally suitable for use with blood or emulsions which tend to clog the pores of the material.

In addition to use in medical infusion equipment apparatus in accordance with the invention may be used to measure any slow liquid flow rate such as may be used in a chemical treatment process. Also means for controlling fluid flow rate as described in my copending Patent application Ser. No. 179,510 may be provided with side markings to indicate flow rate according to adjustment, and apparatus in accordance with the present invention may be used in the production of such means for controlling fluid flow rate to calibrate the scale markings for a particular liquid or liquids.

I claim:

1. Apparatus enabling liquid flow rates to be measured comprising drop-forming means having an orifice at which drops of liquid can be formed, and drop-control means operative in use to support by capillary action a body of liquid with an exposed surface adjacent to the orifice said surface being spaced from the orifice by a distance such that drops forming at the orifice contact said surface of said body of liquid, and are thereby drained, before they attain a size at which they would fall naturally from the orifice under the influence of gravity.

2. Apparatus according to claim 1 in which the drop-control means comprises a length of capillary tube having an open end where said exposed surface is formed in use.

3. Apparatus according to claim 2 in which the drop-forming means comprises a nozzle with said orifice constituting the outlet of said nozzle, and in which the nozzle and the capillary tube are both formed from a non-wettable material, and the capillary tube has a lining formed from a wettable material.

4. Apparatus according to claim 2 in which the drop-forming means comprises a nozzle with said orifice constituting the outlet of said nozzle, and in which support means extends between the nozzle and the capillary tube and whereby the capillary tube is supported by the nozzle.

5. Apparatus according to claim 2 in which the capillary tube leads to an aperture wherein use drops can form and can attain a size such that they fall naturally from the aperture under the influence of gravity.

6. Apparatus according to claim 5 in which there is a chamber which is closed apart from a liquid inlet constituted by said orifice and a liquid outlet, the drop-forming means and drop-control means being inside said chamber.

* * * * *